(12) United States Patent
Yuan et al.

(10) Patent No.: US 12,112,503 B2
(45) Date of Patent: Oct. 8, 2024

(54) METHOD AND APPARATUS FOR CALIBRATING EXTERNAL PARAMETERS OF IMAGE ACQUISITION DEVICE, DEVICE AND STORAGE MEDIUM

(71) Applicant: Beijing Baidu Netcom Science and Technology Co., LTD, Beijing (CN)

(72) Inventors: Caimao Yuan, Beijing (CN); Pengbin Yang, Beijing (CN); Fengze Han, Beijing (CN); Fei Ni, Beijing (CN); Yang Yang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 482 days.

(21) Appl. No.: 17/356,649

(22) Filed: Jun. 24, 2021

(65) Prior Publication Data

US 2021/0319588 A1  Oct. 14, 2021

(30) Foreign Application Priority Data

Jul. 20, 2020 (CN) .......................... 202010699987.6

(51) Int. Cl.
  *G06T 7/80* (2017.01)
  *G06F 17/16* (2006.01)
  (Continued)

(52) U.S. Cl.
  CPC ................ *G06T 7/80* (2017.01); *G06F 17/16* (2013.01); *H04N 17/002* (2013.01);
  (Continued)

(58) Field of Classification Search
  CPC ............. G06T 7/80; G06T 2207/30208; G06T 2207/30256; G06T 2207/30244;
  (Continued)

(56) References Cited

U.S. PATENT DOCUMENTS 10,641,617 B2    5/2020 Hodohara et al.
2012/0287232 A1  11/2012 Natroshvili et al.
(Continued)

FOREIGN PATENT DOCUMENTS

CN    102842127 A   12/2012
CN    104859563 A    8/2015
(Continued)

OTHER PUBLICATIONS

Sep. 29, 2021—(EP)—ESR dtd Sep. 29, 2021—App. No. 21166759.7.

(Continued)

*Primary Examiner* — Marcos L Torres
(74) *Attorney, Agent, or Firm* — Banner & Witcoff, Ltd.

(57) ABSTRACT

The present application discloses a method and an apparatus for calibrating external parameters of an image acquisition device, a device and a storage medium, and relates to the technical field of vehicle positioning. The specific implementation solution is as follows: acquiring an image captured by the image acquisition device; determining a plurality of marking points on a calibration plate in the image; determining a first conversion matrix based on coordinates of each of the marking points in the image pixel coordinate system and the calibration plate coordinate system; determining a second conversion matrix based on coordinates of at least one wheel grounding point of the vehicle in the calibration plate coordinate system and the vehicle body coordinate system; and determining external parameters of the image acquisition device by using the first conversion matrix and the second conversion matrix.

18 Claims, 8 Drawing Sheets

(51) Int. Cl.
  *H04N 17/00* (2006.01)
  *H04N 23/90* (2023.01)
  *B60W 50/06* (2006.01)
  *B60W 60/00* (2020.01)

(52) U.S. Cl.
  CPC ............ *H04N 23/90* (2023.01); *B60W 50/06* (2013.01); *B60W 60/001* (2020.02); *B60W 2420/403* (2013.01); *G06T 2207/30208* (2013.01); *G06T 2207/30256* (2013.01)

(58) Field of Classification Search
  CPC .......... G06T 2207/30252; G06F 17/16; H04N 17/002; H04N 23/90; B60W 50/06; B60W 60/001; B60W 2420/42
  See application file for complete search history.

(56) References Cited

U.S. PATENT DOCUMENTS

| | | | |
|---|---|---|---|
| 2016/0267657 A1* | 9/2016 | Gupta | ............... H04N 17/00 |
| 2017/0277961 A1* | 9/2017 | Kuehnle | ................ G06T 7/80 |
| 2018/0058882 A1 | 3/2018 | Hodohara et al. | |
| 2019/0087977 A1 | 3/2019 | Kim et al. | |
| 2019/0102911 A1 | 4/2019 | Natroshvili et al. | |
| 2021/0183152 A1* | 6/2021 | Berger | ................ G06T 7/55 |

FOREIGN PATENT DOCUMENTS

| | | | |
|---|---|---|---|
| CN | 109118547 | A | 1/2019 |
| CN | 208314858 | U | 1/2019 |
| CN | 110246184 | A | 9/2019 |
| CN | 110264520 | A | 9/2019 |
| CN | 110363819 | A | 10/2019 |
| CN | 110414355 | A | 11/2019 |
| CN | 110599548 | A | 12/2019 |
| CN | 110930462 | A | 3/2020 |
| DE | 102015107677 | A1 | 11/2015 |
| JP | 2011226931 | A | 11/2011 |
| JP | 2014174067 | A | 9/2014 |
| JP | 6211157 | B1 | 10/2017 |
| JP | 2019052983 | A | 4/2019 |
| JP | 2019530261 | A | 10/2019 |
| KR | 20100064205 | A | 6/2010 |
| WO | 2018196391 | A1 | 11/2018 |
| WO | 2019170066 | A1 | 9/2019 |

OTHER PUBLICATIONS

Feb. 22, 2023—(KR) Second Office Action of Appln No. 10-2021-0056760.

1st Office Action CN No. 202010699987.6 dtd May 4, 2023.

Zhang Yu, Peng Jian-ping, Yang Kai and Peng Chao-Yong "Camera Calibration Algorithm for Wheel Profile Inspection", Physical Science and Technology College, Opto-Electronic Engineering, Jul. 2009.

Wu Yan-Lin, Quan Yan-ming, Guo Qing-da "Research on Calibration of Structured Light System Based on Local Homography Matrix", South China University of Technology, Science Technology and Engineering, May 2016.

Aug. 26, 2022—(KR) Office Action—App. No. 10-2021-0056760.

Mar. 8, 2022—(JP) Decision to Grant—App. No. 2021-073973.

* cited by examiner

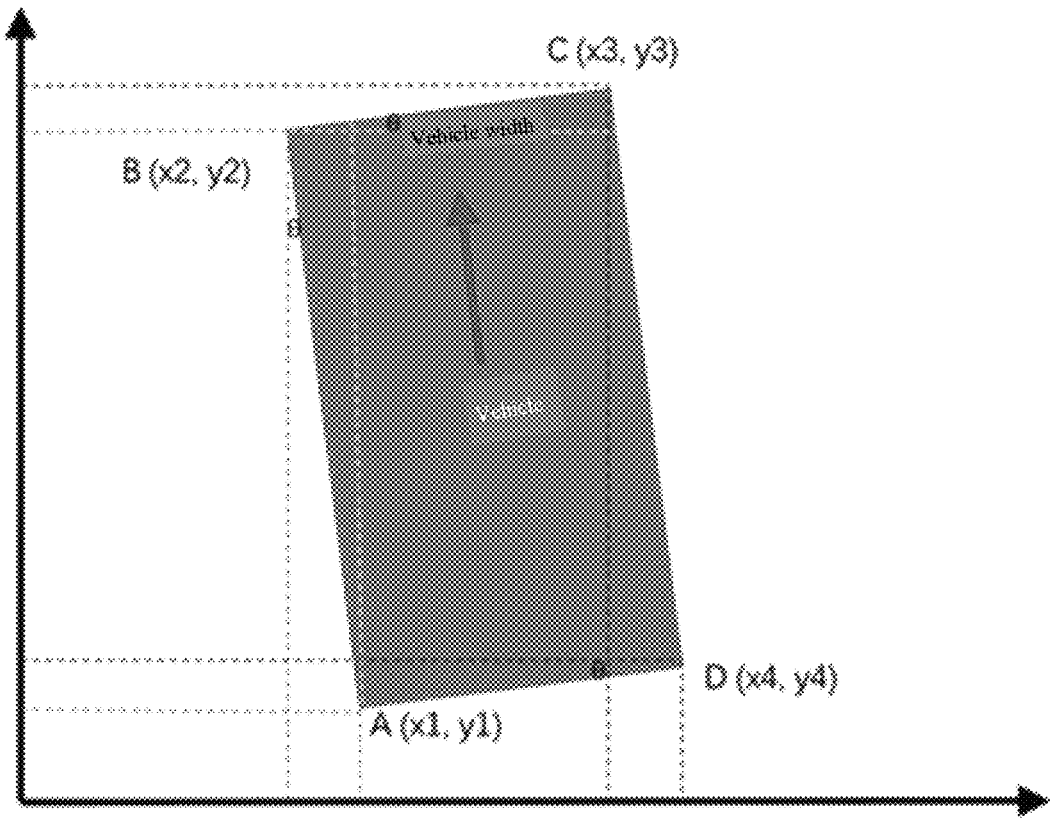

FIG. 4C

| calculating first coordinates of a calibration point in the calibration plate coordinate system by using the coordinates of the calibration point in a calibration plate in the image pixel coordinate system and the first conversion matrix | S501 |

| calculating a distance between the first coordinates and real coordinates of the calibration point in the calibration plate coordinate system, to evaluate the accuracy error of the first conversion matrix | S502 |

FIG. 5 using two image acquisition devices arranged on the same side of the vehicle to respectively fit two corresponding straight lines — S801 determining an angle between the two corresponding straight lines to evaluate the accuracy errors of the external parameters of the image acquisition devices — S802

METHOD AND APPARATUS FOR CALIBRATING EXTERNAL PARAMETERS OF IMAGE ACQUISITION DEVICE, DEVICE AND STORAGE MEDIUM

CROSS-REFERENCE TO RELATED APPLICATION

This application claims priority to Chinese patent application No. 202010699987.6, filed on Jul. 20, 2020, which is hereby incorporated by reference in its entirety.

TECHNICAL FIELD

The present application relates to the field of automatic driving, and in particular to the technical field of vehicle positioning.

BACKGROUND

During automatic driving, it is necessary to determine the precise position of an automatic driving vehicle in a lane, that is, distances between the automatic driving vehicle and the left and right lane lines. Side-viewing image acquisition apparatuses (such as cameras) may be usually placed on both sides of a vehicle, high-resolution images containing the lane lines are obtained by using the cameras, and coordinates of the lane lines in an image pixel coordinate system are determined; then, the coordinates of the lane lines in a vehicle body coordinate system are determined through internal parameters and external parameters of the cameras, and thus the distances between the current vehicle and the lane lines may be obtained, as an accurate measurement value of the position of the vehicle in the lane.

The internal parameters of the camera may refer to the relationship between the image pixel coordinate system and the camera coordinate system, and the external parameters thereof may refer to the relationship between the camera coordinate system and the vehicle body coordinate system. The internal parameters of the camera are fixed values calibrated in advance. In order to ensure the positioning accuracy of the vehicle, it is necessary to calibrate the external parameters of the camera.

At present, there are generally three manners as below to calibrate the external parameters of the camera:

(1) using a prearranged checkerboard calibration board to calibrate the external parameters of each camera respectively;
(2) establish a special calibration site, where the vehicle enters the designated location of the site for calibration; and
(3) a dynamic calibration method combined with motion estimation.

The above three manners calibrate the external parameters of the camera differently, wherein, the application scene of the manner (1) is a small field of view and a close-range scene, and it is required that the calibration board is all within the field of view of the camera and cannot be blocked. Only the external parameters of the camera relative to the calibration plate can be calibrated, and it is difficult to convert the external parameters to be in the body coordinate system. The above manner (2) is applicable to the scenes requiring high calibration precision and calibrating vehicles and cameras with standardization, and requiring special site support. The above manner (3) relies on other sensors, and has low calibration accuracy.

SUMMARY OF THE INVENTION

The present application provides a method and an apparatus for calibrating external parameters of an image acquisition device, a device and a storage medium.

According to an aspect of the present application, there is provided with a method for calibrating external parameters of an image acquisition device which is provided on a body side of the vehicle, and a field of view of which is downward, and a calibration plate being arranged on the ground at the side of the vehicle and being within the field of view of the image acquisition device, the method including:

acquiring an image captured by the image acquisition device;
determining a plurality of marking points on a calibration plate in the image;
determining a first conversion matrix from an image pixel coordinate system to a calibration plate coordinate system based on coordinates of each of the marking points in the image pixel coordinate system and the calibration plate coordinate system;
determining a second conversion matrix from the calibration plate coordinate system to a vehicle body coordinate system based on coordinates of at least one wheel grounding point of the vehicle in the calibration plate coordinate system and the vehicle body coordinate system; and
determining external parameters of the image acquisition device by using the first conversion matrix and the second conversion matrix.

According to another aspect of the present application, there is provided with a method for evaluating accuracy errors of external parameters of an image acquisition device, the external parameters of the image acquisition device being determined by a first conversion matrix from an image pixel coordinate system to a calibration plate coordinate system and a second conversion matrix from the calibration plate coordinate system to a vehicle body coordinate system, the method including:

evaluating accuracy errors of the first conversion matrix and/or the second conversion matrix; wherein,
evaluating an accuracy error of the first conversion matrix includes: calculating first coordinates of a calibration point in the calibration plate coordinate system by using the coordinates of the calibration point in a calibration plate in the image pixel coordinate system and the first conversion matrix; and calculating a distance between the first coordinates and real coordinates of the calibration point in the calibration plate coordinate system, to evaluate the accuracy error of the first conversion matrix;
evaluating an accuracy error of the second conversion matrix includes: calculating second coordinates of a wheel grounding point of the vehicle in the vehicle body coordinate system by using the coordinates of the wheel grounding point of the vehicle in the calibration plate coordinate system and the second conversion matrix; and calculating a distance between the second coordinates and real coordinates of the wheel grounding point in the vehicle body coordinate system, to evaluate the accuracy error of the second conversion matrix.

According to another aspect of the present application, there is provided with an apparatus for calibrating external parameters of an image acquisition device which is provided on a body side of the vehicle, and a field of view of which is downward, and a calibration plate being arranged on the ground at the side of the vehicle and being within the field of view of the image acquisition device, the apparatus including:
  an image acquiring module configured for acquiring an image captured by the image acquisition device;
  a marking point determination module configured for determining a plurality of marking points on a calibration plate in the image;
  a first conversion matrix determination module configured for determining a first conversion matrix from an image pixel coordinate system to a calibration plate coordinate system based on coordinates of each of the marking points in the image pixel coordinate system and the calibration plate coordinate system;
  a second conversion matrix determination module configured for determining a second conversion matrix from the calibration plate coordinate system to a vehicle body coordinate system based on coordinates of at least one wheel grounding point of the vehicle in the calibration plate coordinate system and the vehicle body coordinate system; and
  an external parameter determination module configured for determining external parameters of the image acquisition device by using the first conversion matrix and the second conversion matrix.

According to another aspect of the present application, there is provided with an apparatus for evaluating accuracy errors of external parameters of an image acquisition device, the external parameters of the image acquisition device being determined by a first conversion matrix from an image pixel coordinate system to a calibration plate coordinate system and a second conversion matrix from the calibration plate coordinate system to a vehicle body coordinate system, the apparatus including:
  a first evaluation module and/or a second evaluation module; wherein,
  the first evaluation module includes:
  a first calculation sub-module configured for calculating first coordinates of a calibration point in the calibration plate coordinate system by using the coordinates of the calibration point in a calibration plate in the image pixel coordinate system and the first conversion matrix; and
  a second calculation sub-module configured for calculating a distance between the first coordinates and real coordinates of the calibration point in the calibration plate coordinate system, to evaluate the accuracy error of the first conversion matrix;
  the second evaluation module includes:
  a third calculation sub-module configured for calculating second coordinates of a wheel grounding point of the vehicle in the vehicle body coordinate system by using the coordinates of the wheel grounding point of the vehicle in the calibration plate coordinate system and the second conversion matrix; and
  a fourth calculation sub-module configured for calculating a distance between the second coordinates and real coordinates of the wheel grounding point in the vehicle body coordinate system, to evaluate the accuracy error of the second conversion matrix.

According to another aspect of the present application, there is provided with an electronic device, including:
  at least one processor; and
  a memory communicatively connected with the at least one processor; wherein
  the memory stores instructions executable by the at least one processor, the instructions being executed by the at least one processor to enable the at least one processor to execute the method according to any of the embodiments of the present application.

It should be understood that the content described in this section is not intended to identify key or important features of the embodiment of the present application, nor is it intended to limit the scope of the present application. Other features of the present application will be easily understood through the following description.

BRIEF DESCRIPTION OF THE DRAWINGS

The drawings are used to better understand the present solution and do not constitute definition to the present application. Among the drawings:

FIG. 4C is a schematic diagram of a manner of determining coordinates of a wheel grounding point on the other side of the vehicle in the calibration plate coordinate system based on the coordinates of the wheel grounding point on the one side of the vehicle, according to an embodiment of the present application;

FIG. 5 is a flowchart of implementing the evaluation of an accuracy error of a first conversion matrix, in a method for evaluating accuracy errors of external parameters of an image acquisition device according to an embodiment of the present application;

DETAILED DESCRIPTION OF THE PREFERRED EMBODIMENTS

The exemplary embodiments of the present application are described below in conjunction with the accompanying drawings, which include various details of the embodiments of the present application to facilitate understanding, and should be regarded as merely exemplary. Therefore, those ordinarily skilled in the art should realize that various changes and modifications can be made to the embodiments described herein without departing from the scope and spirit of the present application. Likewise, for clarity and conciseness, descriptions of well-known functions and structures are omitted in the following description.

As such, the prior art lacks a method that may conveniently calibrate the external parameters of the image acquisition device with high accuracy.

Figure 1:
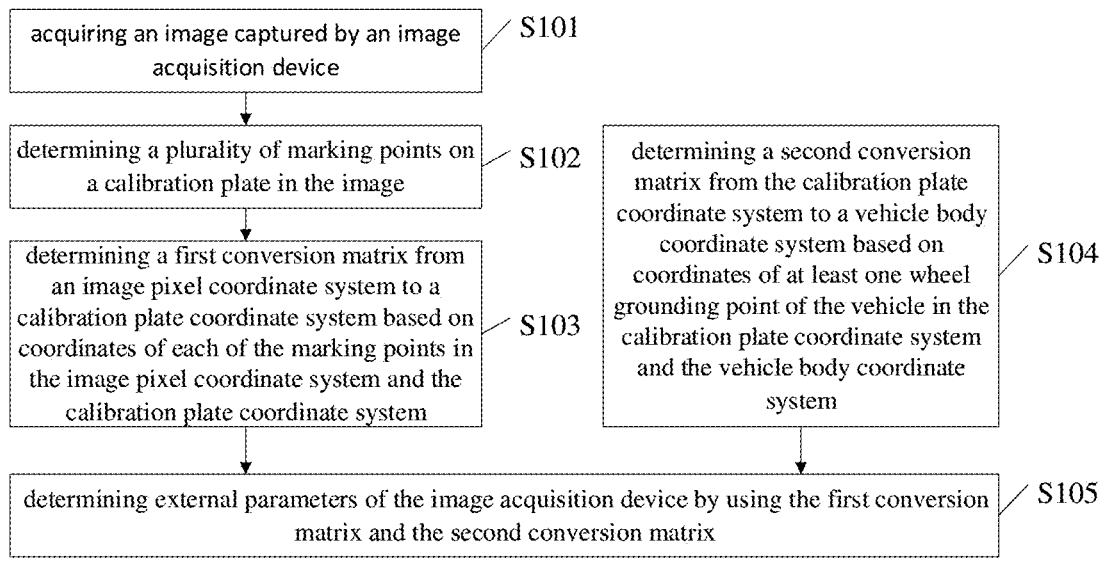
FIG. 1 is a flowchart of implementing a method for calibrating external parameters of an image acquisition device according to an embodiment of the present application.

An embodiment of the present application proposes a method for calibrating external parameters of an image acquisition device which is provided on a body side of the vehicle, and a field of view of which is downward, and a calibration plate being arranged on the ground at the side of the vehicle and being within the field of view of the image acquisition device. FIG. 1 is a flowchart of implementing a method for calibrating external parameters of an image acquisition device according to an embodiment of the present application, including:

S101: acquiring an image captured by the image acquisition device;

S102: determining a plurality of marking points on a calibration plate in the image;

S103: determining a first conversion matrix from an image pixel coordinate system to a calibration plate coordinate system based on coordinates of each of the marking points in the image pixel coordinate system and the calibration plate coordinate system;

S104: determining a second conversion matrix from the calibration plate coordinate system to a vehicle body coordinate system based on coordinates of at least one wheel grounding point of the vehicle in the calibration plate coordinate system and the vehicle body coordinate system; and S105: determining external parameters of the image acquisition device by using the first conversion matrix and the second conversion matrix.

According to another aspect of the present application, there is provided with a non-transitory computer readable storage medium storing computer instructions, wherein the computer instructions cause a computer to execute the method according to any of the embodiments of the present application.

It should be noted that there is no restriction on the order of execution between the above step S104 and the steps S101~S103. They may be executed one after the other, or synchronously.

In some embodiments, one camera may be mounted above each of four wheels of a vehicle, with a field of view of the camera being downward, to capture a distance of about 2 meters on one side of the vehicle. Alternatively, the image taken by the camera may be previewed on a display to adjust the camera to an appropriate position.

In some embodiments, the above-described calibration plate may include a ChArUco calibration plate. The ChArUco calibration plate combines the characteristics of a chessboard calibration board and an ArUco calibration plate, and in the ChArUco calibration plate, each white square is surrounded by four black squares, and likewise each black square is surrounded by four white squares. The corner points of a square may be called chessboard corner points. Each white square has an ArUco mark, and each ArUco mark has a corresponding identification (ID) information. In comparison with a conventional chessboard calibration board, the ChArUco calibration plate has stronger robustness, and the camera can completely observe the entire calibration plate, and because each ArUco mark has a unique ID, the calibration can be completed only by including part of the ChArUco calibration plate image in the image.

Figure 2:
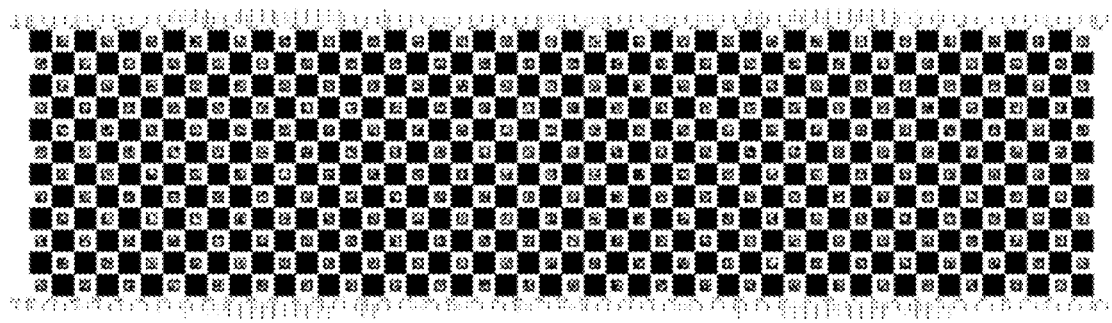
FIG. 2 is a schematic diagram of a ChArUco calibration plate according to an embodiment of the present application.

In some embodiments, length of the ChArUco calibration plate may be determined based on the length of the vehicle, and width of the ChArUco calibration plate may be set to about 1.2 meters. The ChArUco calibration plate may be surrounded by a blank space of the same size as one calibration grid, and precise scales can be drawn in the blank space on both sides of the calibration plate. The whole calibration plate can be printed with ordinary adhesive-backed advertising paper, which is convenient to be carried. FIG. 2 is a schematic diagram of a ChArUco calibration plate according to an embodiment of the present application.

In the above process, three coordinate systems are involved, namely an image pixel coordinate system, a calibration plate coordinate system and a vehicle body coordinate system. Wherein, the image pixel coordinate system may be used for describing positions of pixel points in an image acquired by the image acquisition device, on the image. The image coordinate system may be a rectangular coordinate system that takes an upper left corner of the image as the original point of the coordinate system and takes pixels as the unit, wherein horizontal and vertical coordinates respectively represent the numbers of columns and rows where the pixel points are located in the image.

The calibration plate coordinate system may be a rectangular coordinate system that takes a lower left corner of the calibration plate as the original point, wherein the X-axis direction is rightward and the Y-axis direction is frontward, and the Y-axis coordinate scale has been identified on the calibration plate. Alternatively, the vehicle may be parked in a wide area where the ground is flat and the wheel direction is straight. A calibration plate is laid on the ground under the camera, with a certain distance (for example, about 30 cm) between an edge of the calibration plate and the vehicle.

The vehicle body coordinate system may refer to a rectangular coordinate system that takes a center of a rear axle of the vehicle as the original point, with the X-axis direction being frontward and the Y-axis direction being rightward.

In some embodiments, the acquiring an image captured by the image acquisition device in the above S101 may include: capturing a segment of a calibration plate video with the image acquisition device, i.e., capturing the calibration plate video in a case where the vehicle is stationary and the calibration plate is placed on one side of the vehicle; and then selecting one frame from the video, as the image used for calibrating the acquired the external parameters of the image acquisition device.

In the above S102 and S103, the marking point for determining the first conversion matrix may include a plurality of chessboard corner points on the ChArUco calibration plate. With a ChArUco calibration method, it is possible to determine a first conversion matrix from an image pixel coordinate system to a calibration plate coordinate system, by using coordinates of the chessboard corner points in the image pixel coordinate system and the calibration plate coordinate system.

Figure 3:
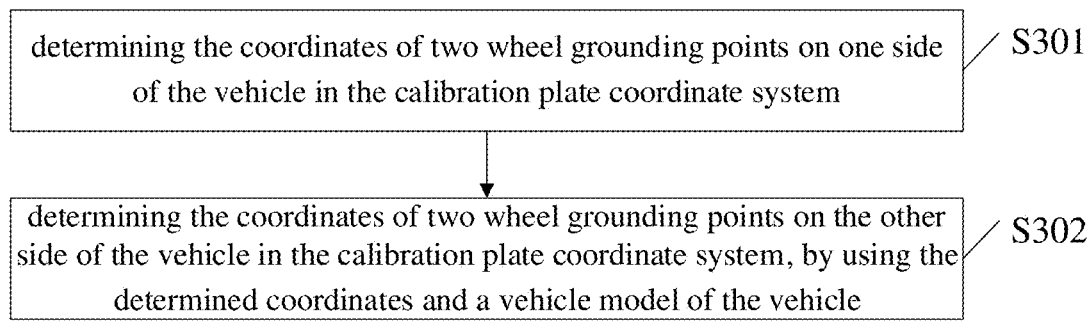
FIG. 3 is a flowchart of implementing the determining coordinates of a wheel grounding point in a calibration plate coordinate system, in a method for calibrating external parameters of an image acquisition device according to an embodiment of the present application.

In the above S104, it is necessary to determine a second conversion matrix from the calibration plate coordinate system to a vehicle body coordinate system, by using coordinates of a wheel grounding point in the calibration plate coordinate system and the vehicle body coordinate system. Wherein, as shown in FIG. 3, the determining the coordinates of the wheel grounding point in the calibration plate coordinate system may include:

S301: determining the coordinates of two wheel grounding points on one side of the vehicle in the calibration plate coordinate system; and S302: determining the coordinates of two wheel grounding points on the other side of the vehicle in the calibration plate coordinate system by using the determined coordinates and a vehicle model of the vehicle.

Figure 4A:
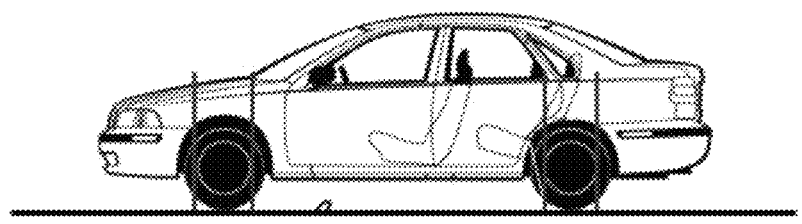
FIG. 4A is a schematic diagram of a manner of performing marking processing by using edges of wheel hubs according to an embodiment of the present application.

In some embodiments, the determining the coordinates of two wheel grounding points on one side of the vehicle in the calibration plate coordinate system in the above S301 may include:

firstly, placing plumb lines at edges of wheel hubs of the two wheels on one side of the vehicle, wherein the lines are tangent to the edges of the wheel hubs, and marks are made using chalk or a marking pen at locations where the plumb lines intersect with the ground. Two marks are made for each wheel. FIG. 4A is a schematic diagram of a manner of performing marking processing by using edges of wheel hubs according to an embodiment of the present application. As shown in FIG. 4A, four marking points may be marked on one side of the vehicle, by placing plumb lines at edges of each wheel hub of the vehicle, and each wheel on this side corresponds to two marking points; the mid-point of the two marking points for each wheel may be the wheel grounding point for that wheel.

Figure 4B:
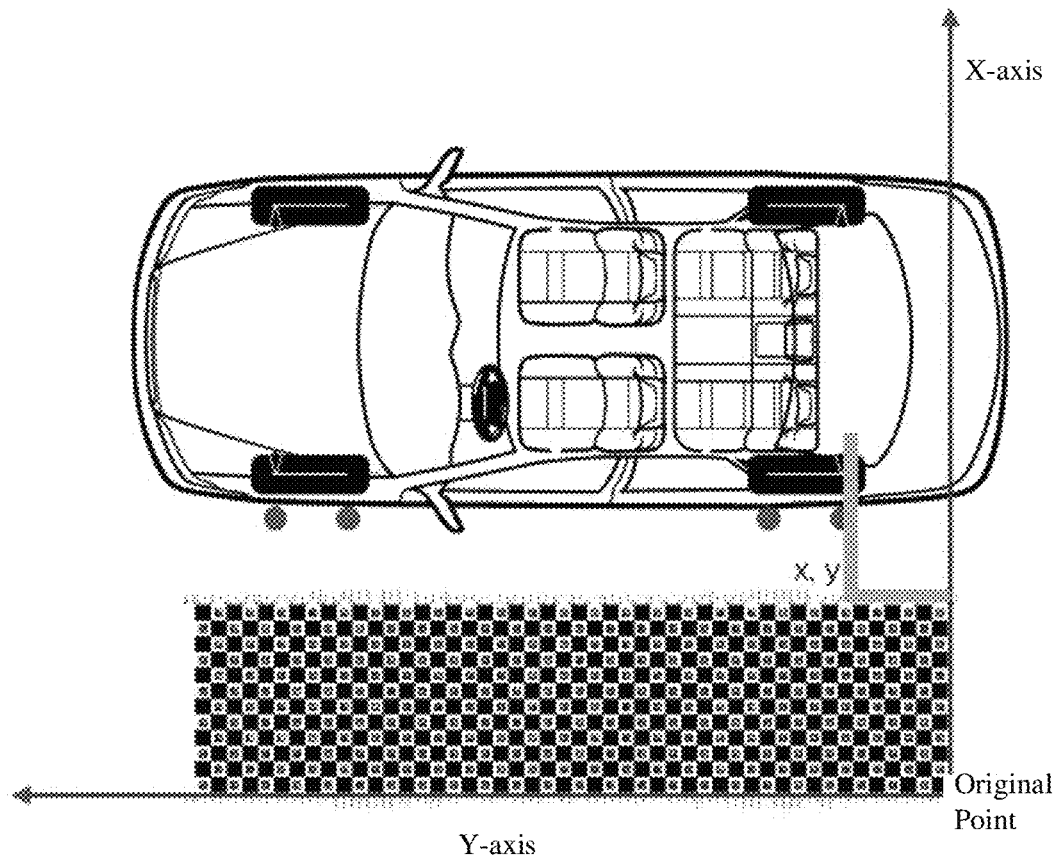
FIG. 4B is a schematic diagram of a manner of determining the coordinates of the wheel grounding point on one side of a vehicle in the calibration plate coordinate system according to an embodiment of the present application.

Then, the coordinates of each marking point in the calibration plate coordinate system can be measured by using a calibration plate and a square master to determine the coordinates of each wheel grounding point in the calibration plate coordinate system. FIG. 4B is a schematic diagram of a manner of determining the coordinates of the wheel grounding point on one side of a vehicle in the calibration plate coordinate system according to an embodiment of the present application. As shown in FIG. 4B, on the left side of the vehicle, each wheel has been marked with two marking points, and the coordinates of the wheel marking points on the same side of the calibration plate in the calibration plate coordinate system may be measured using a square master. For example, one side of the square master is fitted to the edge of the calibration plate and the other side thereof is fitted to the above described marking points, the scale on the square master and the scale of Y-axis on the calibration plate are recorded and converted into the coordinates of the marking points in the calibration plate coordinate system. Then, according to the coordinates of the two corresponding marking points of a wheel in the calibration plate coordinate system, the coordinates of the mid-point of the two marking points are determined, that is, the coordinates of the wheel grounding point of the wheel in the calibration plate coordinate system are determined.

In the above process, the coordinates of two wheel grounding points on one side of the vehicle in the calibration plate coordinate system may be determined, and thereafter, the coordinates of the wheel grounding points on the other side of the vehicle in the calibration plate coordinate system may be determined based on the coordinates of the wheel grounding points on the one side and the vehicle model of the vehicle, i.e., the above S302 is executed. The vehicle model may include information such as vehicle length, vehicle width, wheelbase, and etc. FIG. 4C is a schematic diagram of a manner of determining coordinates of a wheel grounding point on the other side of the vehicle in the calibration plate coordinate system based on the coordinates of the wheel grounding point on the one side of the vehicle, according to an embodiment of the present application. As shown in FIG. 4C, if A and B are two wheel grounding points whose coordinates have been determined, A has coordinates of (x1, y1), and B has coordinate of (x2, y2), the coordinates of the other two wheel grounding points C (x3, y3) and D (x4, y4) in the calibration plate coordinate system can be determined based on a deflection angle of the vehicle and the width W of the vehicle. Specifically:

$$x3=x2+W*\cos\theta;$$

$$y3=y2+W*\sin\theta;$$

$$x4=x1+W*\cos\theta;$$

$$y4=y1+W*\sin\theta;$$

wherein, $\theta=\arctan(|x1-x2|/|y1-y2|)$.

After the coordinates of the wheel grounding points of the vehicle in the calibration plate coordinate system are determined, the second conversion matrix from the calibration plate coordinate system to the vehicle body coordinate system may be determined based on the coordinates of at least one wheel grounding point of the vehicle in the calibration plate coordinate system and the vehicle body coordinate system, i.e., the above S104 is executed. For example, the second conversion matrix may be determined using three wheel grounding points of the vehicle, and the remaining one wheel grounding point may be used for subsequent evaluation of the accuracy error of the second conversion matrix.

Embodiments of the present application further provide a method for evaluating accuracy errors of external parameters of an image acquisition device, the external parameters of the image acquisition device being determined by a first conversion matrix from an image pixel coordinate system to a calibration plate coordinate system and a second conversion matrix from the calibration plate coordinate system to a vehicle body coordinate system, the method including: evaluating accuracy errors of the first conversion matrix and/or the second conversion matrix; wherein, as shown in FIG. 5, evaluating an accuracy error of the first conversion matrix may include:

S501: calculating first coordinates of a calibration point in the calibration plate coordinate system by using the coordinates of the calibration point in a calibration plate in the image pixel coordinate system and the first conversion matrix; and S502: calculating a distance between the first coordinates and real coordinates of the calibration point in the calibration plate coordinate system, to evaluate the accuracy error of the first conversion matrix.

Alternatively, the aforementioned distance may be Euclidean distance.

Figure 6:
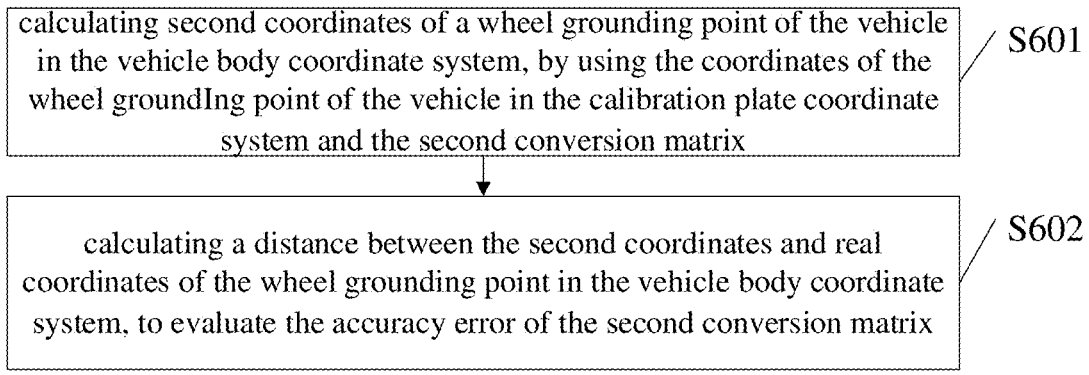
FIG. 6 is a flowchart of implementing the evaluation of an accuracy error of a second conversion matrix, in a method for evaluating accuracy errors of external parameters of an image acquisition device according to an embodiment of the present application.

As shown in FIG. 6, evaluating an accuracy error of the second conversion matrix may include:

S601: calculating second coordinates of a wheel grounding point of the vehicle in the vehicle body coordinate system by using the coordinates of the wheel grounding point of the vehicle in the calibration plate coordinate system and the second conversion matrix; and S602: calculating a distance between the second coordinates and real coordinates of the wheel grounding point in the vehicle body coordinate system, to evaluate the accuracy error of the second conversion matrix.

Alternatively, the aforementioned distance may be Euclidean distance.

Alternatively, in the above process of evaluating the accuracy error, the calibration point used in S501 may include a calibration point on the calibration plate which is not used in determining the first conversion matrix; the wheel grounding point used in S601 may include a wheel grounding point among the wheel grounding points of the vehicle which is not used in determining the second conversion matrix.

For example, if a ChArUco calibration plate is used, the chessboard corner points in the ChArUco calibration plate are used in determining the first conversion matrix; then in evaluating the accuracy error of the first conversion matrix, the corner points marked by ArUco in the ChArUco calibration plate may be used.

As another example, if the vehicle has four wheels, three wheel grounding points of the vehicle are used in determining the second conversion matrix; then, the remaining one wheel grounding point of the vehicle may be used in evaluating the accuracy error of the second conversion matrix.

Figure 7A:
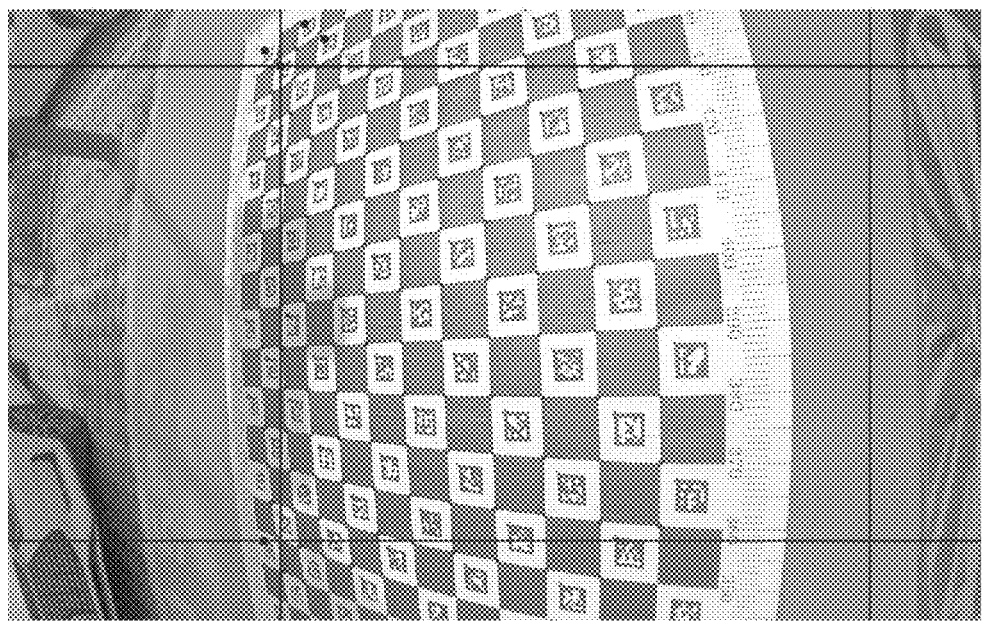
FIG. 7A is a schematic diagram of an accuracy error of a first conversion matrix according to an embodiment of the present application.
Figures 7B, 8:
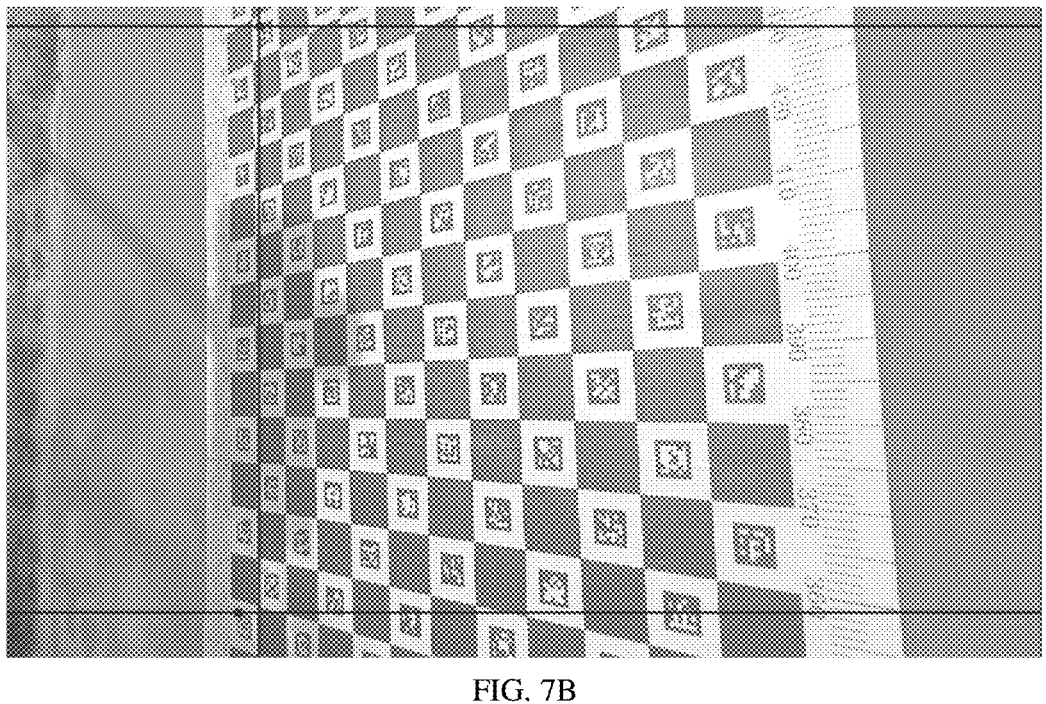
FIG. 7B is a schematic diagram of an image after the image acquired by the image acquisition apparatus is performed with de-distortion processing.
FIG. 8 is a schematic diagram of a method for evaluating an accuracy error according to an embodiment of the present application.

Further, a high-accuracy region of the image acquisition device may be determined using the accuracy error of the above-described first conversion matrix. FIG. 7A is a schematic diagram of an accuracy error of a first conversion matrix according to an embodiment of the present application. In FIG. 7A, there are four black marking points in the upper left corner of the calibration plate and one black marking point in the lower left corner of the calibration plate, and the accuracy of the five black marking points is greater than 1 cm. The accuracy of other marking points in FIG. 7A is between 0.5 cm and 1 cm, or less than 0.5 cm. It can be seen that the accuracy errors of the positions of the five black marking points in FIG. 7A are large, and the high-accuracy region of the image acquisition device may be defined by using the marking points with large errors, and the region defined by the four black straight lines in FIG. 7A is the high-precision region of the image acquisition device. Among them, two black horizontal lines and one black vertical line on the left side are determined by five black marking points with large accuracy errors in FIG. 7A, and one black vertical line on the right side is determined by a boundary of the image after being de-distorted. The de-distorted image is as shown in FIG. 7B.

The above accuracy errors shown in FIG. 5 and FIG. 6 are evaluated directed to the first conversion matrix and the second conversion matrix, respectively. An embodiment of the present application may further evaluate the overall accuracy of the first conversion matrix and the second conversion matrix. FIG. 8 is a schematic diagram of a method for evaluating an accuracy error according to an embodiment of the present application, and the evaluating may include:

S801: using two image acquisition devices arranged on the same side of the vehicle to respectively fit two corresponding straight lines; and S802: determining an angle between the two corresponding straight lines to evaluate the accuracy errors of the external parameters of the image acquisition devices.

Figure 9:
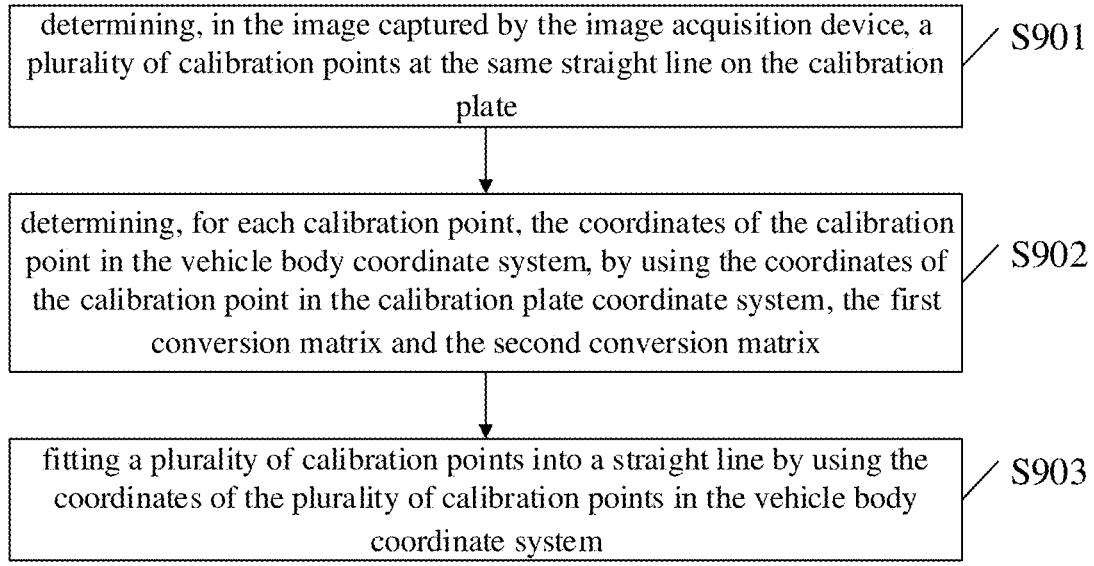
FIG. 9 is a schematic diagram of a manner of fitting a straight line, in a method for evaluating an accuracy error according to an embodiment of the present application.

Alternatively, FIG. 9 is a schematic diagram of a manner of fitting a straight line, in a method for evaluating an accuracy error according to an embodiment of the present application. As shown in FIG. 9, the fitting the straight lines in the above S801 may include:

S901: determining a plurality of calibration points at the same straight line on the calibration plate in an image captured by the image acquisition device;

S902: determining, for each calibration point, the coordinates of the calibration point in the vehicle body coordinate system by using the coordinates of the calibration point in the calibration plate coordinate system as well as the first conversion matrix and the second conversion matrix;

S903: fitting a plurality of calibration points into a straight line by using the coordinates of the plurality of calibration points in the vehicle body coordinate system.

Since the two image acquisition devices on the same side of the vehicle use the calibration points on the same straight line when fitting the straight line, the greater the angle between the two straight lines is, the larger the accuracy errors of the external parameters of the image acquisitions device are.

Figure 10:
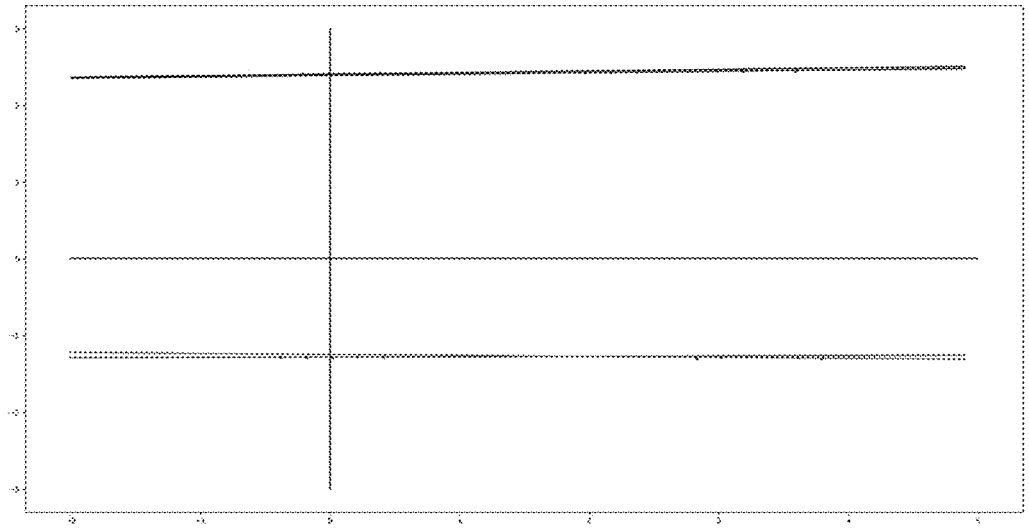
FIG. 10 is a schematic diagram of fitted straight lines according to an embodiment of the present application.

FIG. 10 is a schematic diagram of fitted straight lines according to an embodiment of the present application. The two straight lines in the upper half of FIG. 10 are respectively the straight lines fitted by two image acquisition devices at the front left side and the rear left side of the vehicle; the two intersecting straight lines in the lower half of FIG. 10 are respectively the straight lines fitted by two image acquisition devices at the front right side and the rear right side of the vehicle. There is a certain angle between the straight lines fitted by the two image acquisition devices at the front right side and the rear right side of the vehicle, which indicates that there is a certain error in calibration of the external parameters.

From the above, it can be seen that the method for calibrating external parameters of an image acquisition device, and the method for evaluating accuracy of external parameters of an image acquisition device proposed in the embodiments of the present application can overcome the influence caused by shielding of the calibration plate, and may calculate the conversion relationship with the vehicle body coordinate system conveniently, without the necessity for special calibration site, and thus has good adaptability. In addition, multiple cameras can be calibrated simultaneously without moving the calibration plate and the cameras. Thus in the embodiments of the present application, high calibration accuracy can be achieved, and the calibration error can be measured quantitatively.

Figure 11:
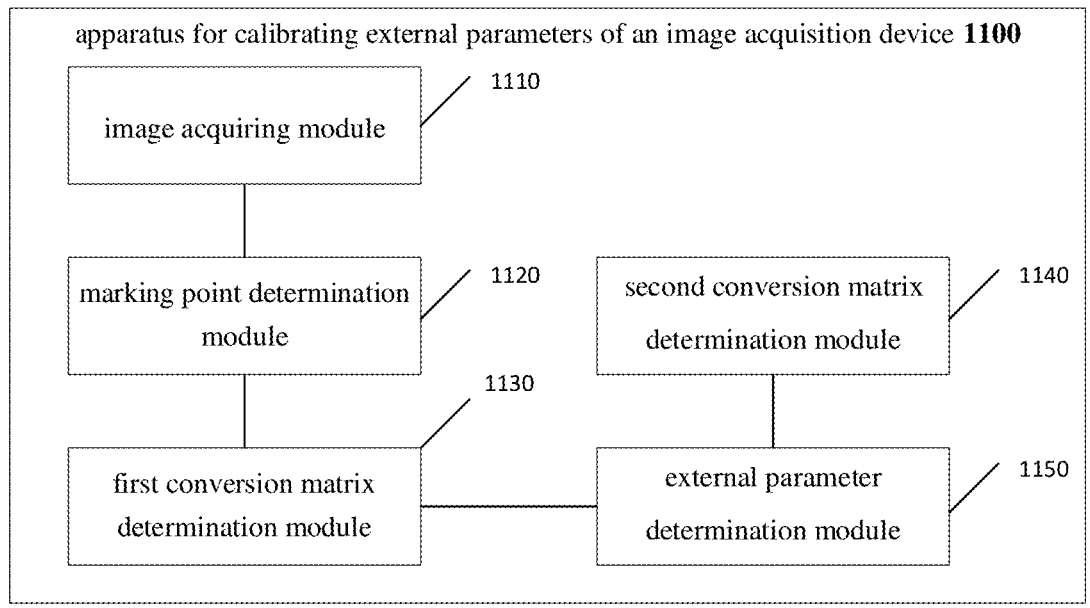
FIG. 11 is a structural schematic of an apparatus 1100 for calibrating external parameters of an image acquisition device according to an embodiment of the present application.

Embodiments of the present application further propose an apparatus for calibrating external parameters of an image acquisition device which is provided on a body side of the vehicle, and a field of view of which is downward, and a calibration plate being arranged on the ground at the side of the vehicle and being within the field of view of the image acquisition device. FIG. 11 is a structural schematic of an apparatus 1100 for calibrating external parameters of an image acquisition device according to an embodiment of the present application, including:

an image acquiring module 1110 configured for acquiring an image captured by an image acquisition device;

a marking point determination module 1120 configured for determining a plurality of marking points on a calibration plate in the image;

a first conversion matrix determination module 1130 configured for determining a first conversion matrix from an image pixel coordinate system to a calibration plate coordinate system based on coordinates of each of the marking points in the image pixel coordinate system and the calibration plate coordinate system;

a second conversion matrix determination module 1140 configured for determining a second conversion matrix from the calibration plate coordinate system to a vehicle body coordinate system based on coordinates of at least one wheel grounding point of the vehicle in the calibration plate coordinate system and the vehicle body coordinate system; and an external parameter determination module 1150 configured for determining external parameters of the image acquisition device by using the first conversion matrix and the second conversion matrix.

Alternatively, the above-described calibration plate may include a ChArUco calibration plate.

Alternatively, the above-described marking point determination module 1120 may be used for determining a plurality of chessboard corner points on the ChArUco calibration plate.

Figure 12:
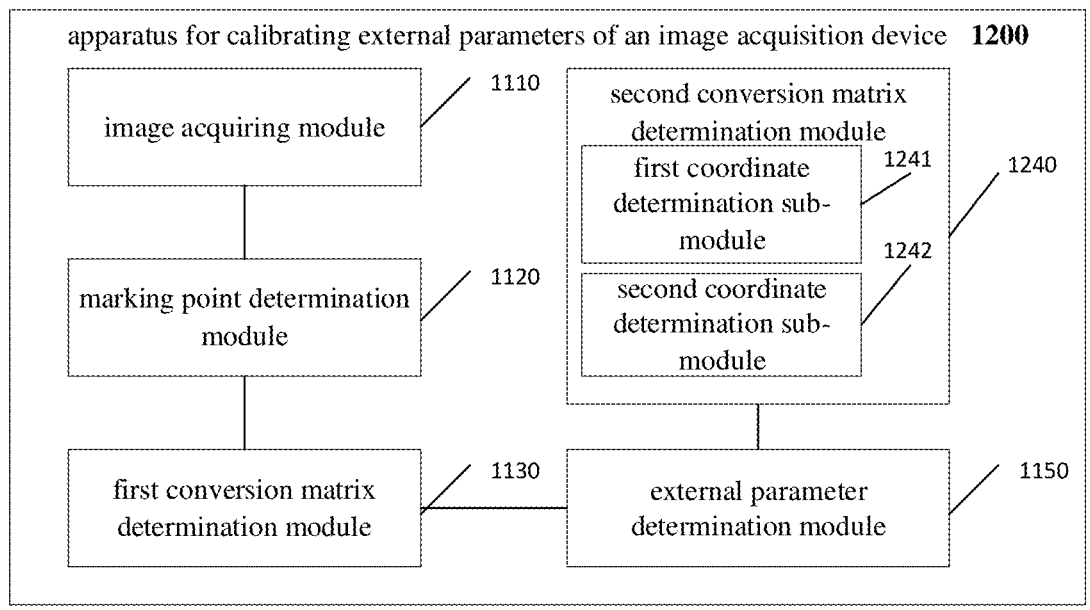
FIG. 12 is a structural schematic of an apparatus 1200 for calibrating external parameters of an image acquisition device according to an embodiment of the present application.

FIG. 12 is a structural schematic of an apparatus 1200 for calibrating external parameters of an image acquisition device according to an embodiment of the present application, including: an image acquiring module 1110, a marking point determination module 1120, a first conversion matrix determination module 1130, a second conversion matrix determination module 1240 and an external parameter determination module 1150.

Wherein the second conversion matrix determination module 1240 may include:

a first coordinate determination sub-module 1241 configured for determining the coordinates of two wheel grounding points on one side of the vehicle in the calibration plate coordinate system; and a second coordinate determination sub-module 1242 configured for determining the coordinates of two wheel grounding points on the other side of the vehicle in the calibration plate coordinate system by using the determined coordinates and a vehicle model of the vehicle.

Figure 13:
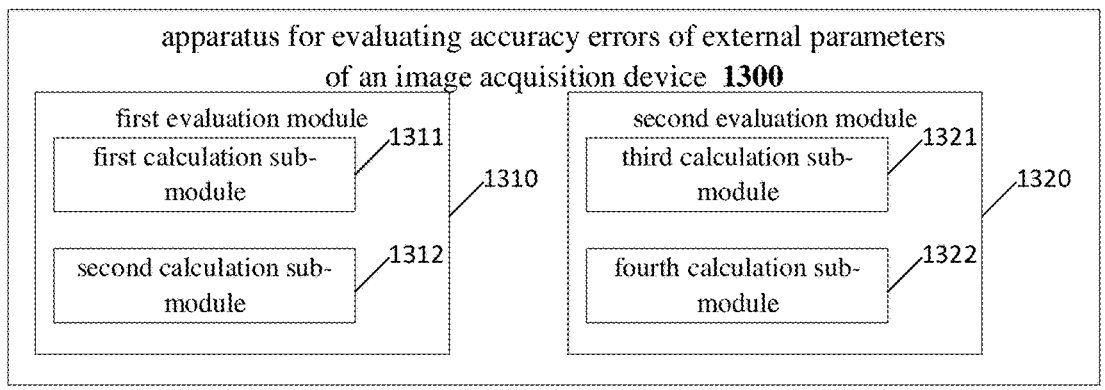
FIG. 13 is a structural schematic of an apparatus 1300 for evaluating accuracy errors of external parameters of an image acquisition device according to an embodiment of the present application.

Embodiments of the present application may further provide an apparatus for evaluating accuracy errors of external parameters of an image acquisition device, the external parameters of the image acquisition device being determined by a first conversion matrix from an image pixel coordinate system to a calibration plate coordinate system and a second conversion matrix from the calibration plate coordinate system to a vehicle body coordinate system. FIG. 13 is a structural schematic of an apparatus 1300 for evaluating accuracy errors of external parameters of an image acquisition device according to an embodiment of the present application, including:

a first evaluation module 1310 and/or a second evaluation module 1320; wherein, the first evaluation module 1310 may include:

a first calculation sub-module 1311 configured for calculating first coordinates of a calibration point in the calibration plate coordinate system by using the coordinates of the calibration point in a calibration plate in the image pixel coordinate system and the first conversion matrix; and a second calculation sub-module 1312 configured for calculating a distance between the first coordinates and real coordinates of the calibration point in the calibration plate coordinate system, to evaluate the accuracy error of the first conversion matrix;

and the second evaluation module 1320 may include:

a third calculation sub-module 1321 configured for calculating second coordinates of a wheel grounding point of the vehicle in the vehicle body coordinate system by using the coordinates of the wheel grounding point of the vehicle in the calibration plate coordinate system and the second conversion matrix; and a fourth calculation sub-module 1322 configured for calculating a distance between the second coordinates and real coordinates of the wheel grounding point in the vehicle body coordinate system, to evaluate the accuracy error of the second conversion matrix.

Alternatively, the above described first calculation sub-module 1311 may utilize a calibration point on the calibration plat which is not used in determining the first conversion matrix.

The above described third calculation sub-module 1321 may utilize a wheel grounding point among the wheel grounding points of the vehicle which is not used in determining the second conversion matrix.

Alternatively, the above-described calibration plate may include a ChArUco calibration plate.

Figure 14:
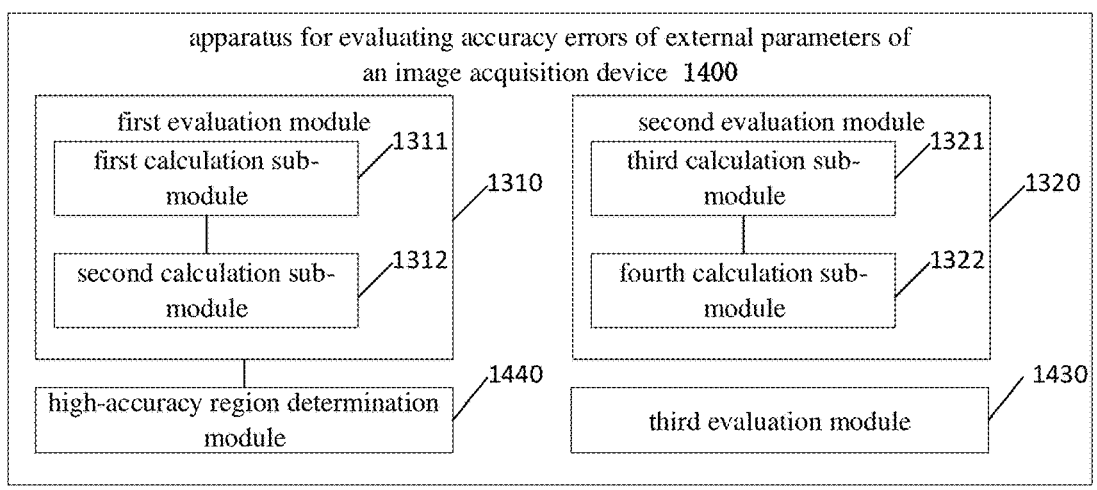
FIG. 14 is a structural schematic of an apparatus 1400 for evaluating accuracy errors of external parameters of an image acquisition device according to an embodiment of the present application.

FIG. 14 is a structural schematic of an apparatus 1400 for evaluating accuracy errors of external parameters of an image acquisition device according to an embodiment of the present application. As shown in FIG. 14, the apparatus may further include:

a third evaluation module 1430 configured for, using two image acquisition devices arranged on the same side of the vehicle to respectively fit two corresponding straight lines; and determining an angle between the two corresponding straight lines to evaluate the accuracy errors of the external parameters of the image acquisition device, wherein using the image acquisition devices to fit the straight lines may include: determining a plurality of calibration points at the same straight line on the calibration plate in the image captured by the image acquisition device; determining, for each calibration point, the coordinates of the calibration point in the vehicle body coordinate system using the coordinates of the calibration point in the calibration plate coordinate system as well as the first conversion matrix and the second conversion matrix; and fitting a plurality of calibration points into a straight line by using the coordinates of the plurality of calibration points in the vehicle body coordinate system;

a high-accuracy region determination module 1440 configured for determining a high-accuracy region of the image acquisition device by using the accuracy error of the first conversion matrix.

The functions of the modules of the apparatuses according to the embodiment of the present application may refer to the corresponding description in the above method, which is not repeated here.

According to the embodiments of the present application, the present application may further provide an electronic device and a readable storage medium.

Figure 15:
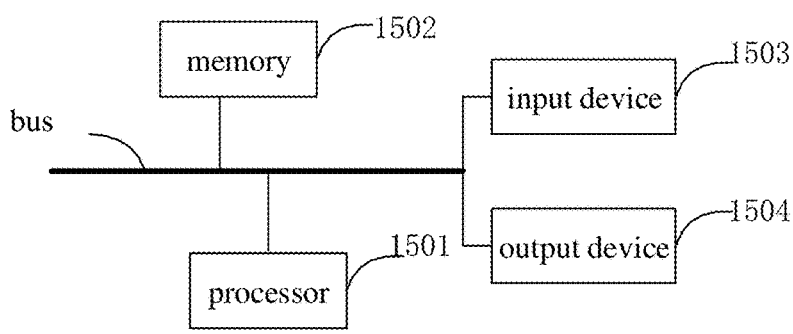
FIG. 15 is a block diagram of an electronic device configured for implementing the method according to an embodiment of the present application.

As shown in FIG. 15, a block diagram is shown of an electronic device of a method for calibrating external parameters of an image acquisition device or a method for evaluating accuracy errors of external parameters of an image acquisition device according to the embodiments of the present application. The electronic device is intended to represent various forms of digital computers, such as a laptop computer, a desktop computer, a workstation, a personal digital assistant, a server, a blade server, a mainframe computer, and other suitable computers. The electronic device can also represent various forms of mobile devices, such as personal digital assistant, a cellular phone, a smart phone, a wearable device, and other similar computing devices. The components shown herein, their connections and relationships, and their functions are merely examples, and are not intended to limit the implementation of the present application described and/or required herein.

As shown in FIG. 15, the electronic device may include: one or more processors 1501 and a memory 1502, and interfaces for connecting components, including high-speed interfaces and low-speed interfaces. The components are connected to each other by using different buses, and can be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other implementations, a plurality of processors and/or buses may be used with a plurality of memories, if necessary. Similarly, multiple electronic devices can be connected, and each device provides some necessary operations (for example, as a server array, a group of blade servers, or a multi-processor system). One processor 1501 is taken as an example in FIG. 15.

The memory 1502 is the non-transitory computer readable storage medium provided in the present application. Wherein, the memory stores instructions that can be executed by at least one processor, so that the at least one processor executes the method for calibrating external parameters of an image acquisition device or the method for evaluating accuracy errors of external parameters of an image acquisition device provided by the present application. The non-transitory computer readable storage medium of the present application stores computer instructions, and the computer instructions are used to cause a computer to execute the method for calibrating external parameters of an image acquisition device or the method for evaluating accuracy errors of external parameters of an image acquisition device provided by the present application.

As a non-transitory computer readable storage medium, the memory 1502 can be used to store non-transitory software programs, non-transitory computer executable programs and modules, such as program instructions/modules corresponding to the method for calibrating external parameters of an image acquisition device in the embodiment of the present application (such as the image acquiring module 1110, the marking point determination module 1120, the first conversion matrix determination module 1130, the second conversion matrix determination module 1140 and the external parameter determination module 1150 that are shown in FIG. 11), or such as program instructions/modules corresponding to the method for evaluating accuracy errors of external parameters of an image acquisition device in the embodiment of the present application (such as the first evaluation module 1310 and/or the second evaluation module 1320 that are shown in FIG. 13). The processor 1501 executes various functional applications and data processing of the server by running the non-transitory software programs, the instructions and the modules that are stored in the memory 1502, that is, implementing the method for calibrating external parameters of an image acquisition device or the method for evaluating accuracy errors of external parameters of an image acquisition device in the foregoing method embodiment.

The memory 1502 may include a program storage area and a data storage area, wherein the program storage area may store an operating system and an application program required by at least one function; the data storage area may store data created based on use of an electronic device for calibrating external parameters of an image acquisition device or evaluating accuracy errors of external parameters of an image acquisition device. Moreover, the memory 1502 may include a high-speed random access memory, and may also include a non-transitory memory, such as at least one magnetic disk storage device, a flash memory device, or other non-transitory solid-state storage devices. In some embodiments, the memory 1502 may optionally include a memory provided remotely with respect to the processor 1501, and these remote memories may be connected to an electronic device for calibrating external parameters of an image acquisition device or evaluating accuracy errors of external parameters of an image acquisition device. Examples of the aforementioned network include, but are not limited to, Internet, a corporate Intranet, a local area network, a mobile communication network, and combinations thereof.

The electronic device of a method for calibrating external parameters of an image acquisition device or a method for evaluating accuracy errors of external parameters of an image acquisition device may further include an input device 1503 and an output device 1504. The processor 1501, the memory 1502, the input device 1503, and the output device 1504 may be connected through a bus or other means, and in FIG. 15, for example, through a bus.

The input device 1503 can receive the input numeric or character information, and generate a key signal input related to user setting and function control of the electronic device for calibrating external parameters of an image acquisition device or evaluating accuracy errors of external parameters of an image acquisition device, such as a touch screen, a keypad, a mouse, a track pad, a touch pad, an indicating rod, one or more mouse buttons, trackballs, joysticks and other input devices. The output device 1504 may include a display device, an auxiliary lighting apparatus (for example, an LED), a haptic feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the system and technologies described herein can be implemented in a digital electronic circuit system, an integrated circuit system, an application-specific integrated circuit (ASIC), a computer hardware, a firmware, a software, and/or combinations thereof. These various embodiments may include: being implemented in one or more computer programs, the one or more computer programs may be executed and/or interpreted on a programmable system including at least one programmable processor, the programmable processor can be a dedicated or general-purpose programmable processor that can receive data and instructions from a storage system, at least one input device, and at least one output device, and transmit the data and instructions to the storage system, the at least one input device, and the at least one output device.

These computation programs (also referred to as programs, software, software application, or codes) include machine instructions of the programmable processors, and these computation programs can be implemented by using high-level procedures and/or object-oriented programming languages, and/or assembly/machine languages. As used herein, the terms "machine readable media" and "computer readable media" refer to any computer program product, device, and/or apparatus (such as a magnetic disk, an optical disk, a memory, a programmable logic devices (PLD)) used to provide machine instructions and/or data to a programmable processor, including a machine readable media that receives machine instructions as machine readable signals. The term "machine readable signals" refers to any signal used to provide machine instructions and/or data to a programmable processor.

In order to provide interaction with the user, the system and technology described herein can be implemented on a computer that has: a display device for displaying information to the user (such as a CRT (cathode ray tube) or an LCD (liquid crystal display) monitor)); and a keyboard and a pointing device (such as a mouse or a trackball) through which the user can provide the input to the computer. Other types of apparatuses can also be used to provide interaction with the user; for example, the feedback provided to the user can be any form of sensing feedback (for example, visual feedback, auditory feedback, or haptic feedback); and the input from the user can be received in any form (including acoustic input, voice input, or haptic input).

The system and technology described herein can be implemented in a computing system including back-end components (for example, as a data server), or a computing system including middleware components (for example, an application server), or a computing system including front-end components (for example, a user computer having a graphical user interface or a web browser through which the user can interact with the embodiment of the system and technology described herein), or a computing system including any combination of such back-end components, middleware components or front-end components. The components of the system can be connected to each other through digital data communication (for example, a communication network) in any form or media. Examples of the communication network include: a local area network (LAN), a wide area network (WAN), and an Internet.

The computer system can include a client and a server. The client and the server are generally far away from each other and usually interact through a communication network. The relationship between the client and the server is generated by computer programs that run on the corresponding computers and have a client-server relationship with each other. The server may be a cloud server, also known as a cloud computing server or a cloud host, and is a hosting product in a cloud computing service system, so as to solve the defects of high management difficulty and weak business expansion in the traditional physical host and the virtual private server (VPS) service.

It should be understood that the various forms of processes shown above can be used to reorder, add or delete steps. For example, the steps described in the present application can be performed in parallel, or in sequence or in a different order, as long as the result desired by the technical solution disclosed in the present application can be achieved, and this is not limited herein.

The foregoing specific embodiments do not constitute limitation to the protection scope of the present application. Those skilled in the art should understand that various modifications, combinations, sub-combinations, and substitutions can be made based on design requirements and other factors. Any amendments, equivalent substitutions and improvements made within the spirit and principle of the present application are intended to be included within the protection scope of the present application.

The invention claimed is:

1. A method for calibrating external parameters of an image acquisition device which is provided on a body side of a vehicle, and a field of view of which is downward, and a calibration plate being arranged on the ground at the body side of the vehicle and being within the field of view of the image acquisition device, the method comprising:
    acquiring an image captured by the image acquisition device;
    determining a plurality of marking points on a calibration plate in the image;
    determining a first conversion matrix from an image pixel coordinate system to a calibration plate coordinate system based on coordinates of each of the marking points in the image pixel coordinate system and the calibration plate coordinate system;
    determining a second conversion matrix from the calibration plate coordinate system to a vehicle body coordinate system based on coordinates of at least one wheel grounding point of the vehicle in the calibration plate coordinate system and the vehicle body coordinate system; and
    determining external parameters of the image acquisition device by using the first conversion matrix and the second conversion matrix;
    wherein, determining the coordinates of the wheel grounding point in the calibration plate coordinate system, comprises:
    determining the coordinates of two wheel grounding points on one side of the vehicle in the calibration plate coordinate system; and
    determining the coordinates of two wheel grounding points on the other side of the vehicle in the calibration plate coordinate system by using the determined coordinates and a vehicle model of the vehicle.

2. The method according to claim 1, wherein, the calibration plate comprises a ChArUco calibration plate.

3. The method according to claim 2, wherein, the determining the plurality of marking points on the calibration plate in the image, comprises: determining a plurality of chessboard corner points on the ChArUco calibration plate.

4. A method for evaluating accuracy errors of external parameters of an image acquisition device, the external parameters of the image acquisition device being determined by the method of claim 1,
    the method comprising:
    evaluating accuracy errors of the first conversion matrix and/or the second conversion matrix; wherein,
    wherein, evaluating an accuracy error of the first conversion matrix comprises: calculating first coordinates of a calibration point in the calibration plate coordinate system by using the coordinates of the calibration point in a calibration plate in the image pixel coordinate system and the first conversion matrix; and calculating a distance between the first coordinates and real coordinates of the calibration point in the calibration plate coordinate system, to evaluate the accuracy error of the first conversion matrix; and wherein, evaluating an accuracy error of the second conversion matrix comprises: calculating second coordinates of a wheel grounding point of the vehicle in the vehicle body coordinate system by using the coordinates of the wheel grounding point of the vehicle in the calibration plate coordinate system and the second conversion matrix; and calculating a distance between the second coordinates and real coordinates of the wheel grounding point in the vehicle body coordinate system, to evaluate the accuracy error of the second conversion matrix.

5. The method according to claim 4, wherein the calibration point in the calibration plate comprises a calibration point in the calibration plate which is not used in determining the first conversion matrix; and the wheel grounding point of the vehicle comprises a wheel grounding point among the wheel grounding points of the vehicle that is not used in determining the second conversion matrix.

6. The method according to claim 4, wherein the calibration plate comprises a ChArUco calibration plate.

7. The method according to claim 4, further comprising: using two image acquisition devices arranged on the same side of the vehicle to respectively fit two corresponding straight lines; and determining an angle between the two corresponding straight lines to evaluate the accuracy errors of the external parameters of the image acquisition devices;

wherein, using the image acquisition devices to fit the straight lines comprises:

determining a plurality of calibration points at the same straight line on the calibration plate, in the image captured by the image acquisition device;

determining, for each calibration point, the coordinates of the calibration point in the vehicle body coordinate system, by using the coordinates of the calibration point in the calibration plate coordinate system, the first conversion matrix and the second conversion matrix; and fitting the plurality of calibration points into a straight line by using the coordinates of the plurality of calibration points in the vehicle body coordinate system.

8. The method according to claim 4, further comprising: determining a high-accuracy region of the image acquisition device by using the accuracy error of the first conversion matrix.

9. An apparatus for calibrating external parameters of an image acquisition device which is provided on a body side of a vehicle, and a field of view of which is downward, and a calibration plate being arranged on the ground at the body side of the vehicle and being within the field of view of the image acquisition device, the apparatus comprising:

a processor and a memory for storing one or more computer programs executable by the processor, wherein when executing at least one of the computer programs, the processor is configured to perform operations comprising:

acquiring an image captured by the image acquisition device;

determining a plurality of marking points on a calibration plate in the image;

determining a first conversion matrix from an image pixel coordinate system to a calibration plate coordinate system based on coordinates of each of the marking points in the image pixel coordinate system and the calibration plate coordinate system;

determining a second conversion matrix from the calibration plate coordinate system to a vehicle body coordinate system based on coordinates of at least one wheel grounding point of the vehicle in the calibration plate coordinate system and the vehicle body coordinate system; and determining external parameters of the image acquisition device by using the first conversion matrix and the second conversion matrix;

wherein, when executing at least one of the computer programs, the processor is configured to further perform operations comprising:

determining the coordinates of two wheel grounding points on one side of the vehicle in the calibration plate coordinate system; and determining the coordinates of two wheel grounding points on the other side of the vehicle in the calibration plate coordinate system by using the determined coordinates and a vehicle model of the vehicle.

10. The apparatus according to claim 9, wherein, the calibration plate comprises a ChArUco calibration plate.

11. The apparatus according to claim 10, wherein, when executing at least one of the computer programs, the processor is configured to further perform operations comprising determining a plurality of chessboard corner points on the ChArUco calibration plate.

12. The apparatus according to claim 9, wherein, when executing at least one of the computer programs, the processor is configured to perform the method of claim 4.

13. The apparatus according to claim 12, wherein, when executing at least one of the computer programs, the processor is configured to further perform operations comprising:

utilizing a calibration point in the calibration plate which is not used in determining the first conversion matrix; and utilizing a wheel grounding point among the wheel grounding points of the vehicle which is not used in determining the second conversion matrix.

14. The apparatus according to claim 12, wherein the calibration plate comprises a ChArUco calibration plate.

15. The apparatus according to claim 12, wherein, when executing at least one of the computer programs, the processor is configured to further perform operations comprising:

using two image acquisition devices arranged on the same side of the vehicle to respectively fit two corresponding straight lines; and determining an angle between the two corresponding straight lines to evaluate the accuracy errors of the external parameters of the image acquisition devices, wherein, when executing at least one of the computer programs, the processor is configured to further perform operations comprising: determining a plurality of calibration points at the same straight line on the calibration plate, in the image captured by the image acquisition device; determining, for each calibration point, the coordinates of the calibration point in the vehicle body coordinate system, by using the coordinates of the calibration point in the calibration plate coordinate system, the first conversion matrix and the second conversion matrix; and fitting the plurality of calibration points into a straight line by using the coordinates of the plurality of calibration points in the vehicle body coordinate system.

16. The apparatus according to claim 12, wherein, when executing at least one of the computer programs, the processor is configured to further perform operations comprising:
   determining a high-accuracy region of the image acquisition device, by using the accuracy error of the first conversion matrix.

17. A non-transitory computer readable storage medium storing computer instructions, wherein, the computer instructions cause a computer to execute the method according to claim 1.

18. The non-transitory computer readable storage medium according to claim 17, wherein, the computer instructions cause a computer to execute the method according to claim 4.

* * * * *